Figure 2:
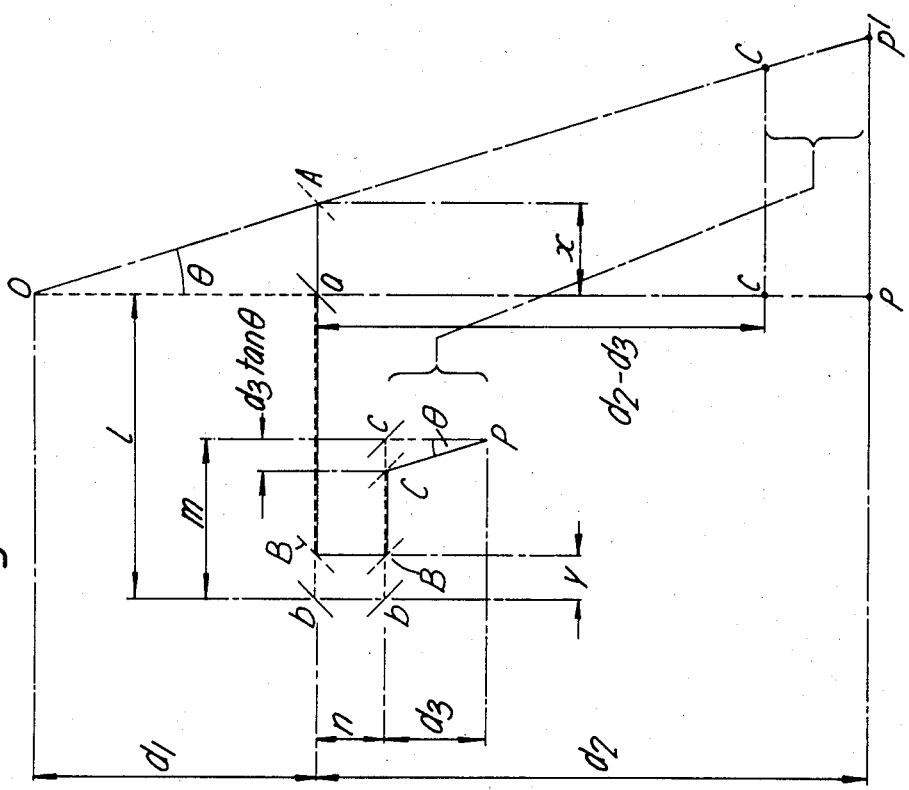

United States Patent [19]

Ravenshear

[11] Patent Number: 4,728,986

[45] Date of Patent: Mar. 1, 1988

[54] OPTICAL SCANNING

[75] Inventor: Arthur C. E. Ravenshear, Harrow, United Kingdom

[73] Assignee: The Imtec Group plc, Stanmore, England

[21] Appl. No.: 5,200

[22] PCT Filed: Apr. 11, 1986

[86] PCT No.: PCT/GB86/00203

§ 371 Date: Dec. 12, 1986

§ 102(e) Date: Dec. 12, 1986

[87] PCT Pub. No.: WO86/06181

PCT Pub. Date: Oct. 23, 1986

[30] Foreign Application Priority Data

Apr. 12, 1985 [GB] United Kingdom ............... 8509416

[51] Int. Cl.4 ............... G03G 15/28; G03G 15/32; G03B 27/70
[52] U.S. Cl. ............................... 355/8; 355/11; 355/66
[58] Field of Search ............................... 355/8, 11, 66

[56] References Cited

U.S. PATENT DOCUMENTS 3,884,574  5/1975  Doi et al. .
4,023,897  5/1977  Clark .
4,372,670  2/1983  Carpenter et al. .
4,462,674  7/1984  Nishikawa .

FOREIGN PATENT DOCUMENTS 2122360  1/1984  United Kingdom .
2110397  9/1985  United Kingdom .

OTHER PUBLICATIONS

IBM Technical Disclosure Bulletin, vol. 15, No. 9 of Feb. 1973: "Optics/Scanning for Copier with Stationary Flat Document Plane", by C. A. Quenner (4 pp.).
IBM Technical Disclosure Bulletin, vol. 15, No. 4 of Sep. 1972: "Scanning System Incorporating Translating and Rotating Mirrors", by M. J. Miller (2 pp.).

Primary Examiner—Monroe H. Hayes
Attorney, Agent, or Firm—Michael J. Striker

[57] ABSTRACT

An optical scanning system for projecting an image onto a moving surface comprises four reflecting surfaces, a first or scan reflecting surface to deflect an incident light ray into a first direction, second and third reflecting surfaces mutually at right angles which together reflect the ray from the first reflecting surface in a direction opposite to the first direction and displaced laterally therefrom, and a fourth or exit reflecting surface to receive the ray reflected from the third reflecting surface and to deflect it parallel to the incident ray onto the moving surface. The scan and exit reflecting surfaces are maintained at right angles to each other as they are translated in opposite directions during a full scan of the image. The second and third reflecting surfaces are translated together in the same direction as the scan reflecting surface, and the translations of the scan and exit reflecting surfaces are effected at respective uniform rates each of which has a fixed ratio to the rate of movement of the moving surface.

Rocking or tipping of the scan and exit reflecting surfaces during translation is effected automatically by a cam and cam follower for each.

9 Claims, 6 Drawing Figures

Output Motion: $\dfrac{d_1-d_3}{2d_1}x - \{r(1-\cos Kx) - l + \sqrt{l^2-(r\sin Kx)^2}\}$ Input Motion: $\dfrac{d_1-d_3}{2d_1}x$ Where $K = 28.6497 \dfrac{d_1-d_3}{d_1 R}$ °/mm ——— : $\tfrac{1}{2}(d_2-d_3)\left(\sqrt{\dfrac{x^2}{d_1^2}+1}-1\right)$ --- : $r(1-\cos Kx) - l + \sqrt{l^2-(r\sin Kx)^2}$

OPTICAL SCANNING

This invention relates to an improved optical scanning system which is inter alia capable of projecting an image onto a moving photoconductive surface as part of a xerographic copying apparatus.

According to one aspect of the invention an optical scanning system for projecting an image onto a moving surface, comprises four reflecting surfaces, a first or scan reflecting surface to deflect an incident light ray into a first direction, second and third reflecting surfaces mutually at right angles which together reflect the ray from the first reflecting surface in a direction opposite to the first direction and displaced laterally therefrom and a fourth or exit reflecting surface to receive the ray reflected from the third reflecting surface and to deflect it parallel to the incident ray onto the moving surface, wherein the scan and exit reflecting surfaces are maintained at right angles to each other as they are translated in opposite directions during a full scan of said image, the second and third reflecting surfaces are translated together in the same direction as the scan reflecting surface, and the translations of the scan and exit reflecting surfaces are effected at respective uniform rates each of which has a fixed ratio to the rate of movement of the moving surface.

Suitably the moving surface on which the scanned image is projected is the surface of a drum, the translations of the scan and exit reflecting surfaces being driven from a drive member of the drum. Conveniently, the translation of the second and third reflecting surfaces is also driven from the drive member of the drum via a motion rate perturbing means.

Conveniently rocking or tipping of the scan and exit reflecting surfaces is effected automatically as a consequence of their translation via a respective cam/cam follower arrangement for each.

The motion rate perturbing means for the second and third reflecting surfaces can be a cam-operated or 4-bar linkage.

Preferably the translations of the scan, linked second and third, and exit reflecting surfaces are in the ratios $d_1:\frac{1}{2}(d_1-d_3):d_3$, where $d_1$ and $d_3$ are multiples of even integers.

Possible ratios are 88:31:26 or 54:19:16, but clearly other ratios can be chosen within the ambit of this invention.

Figure 1:
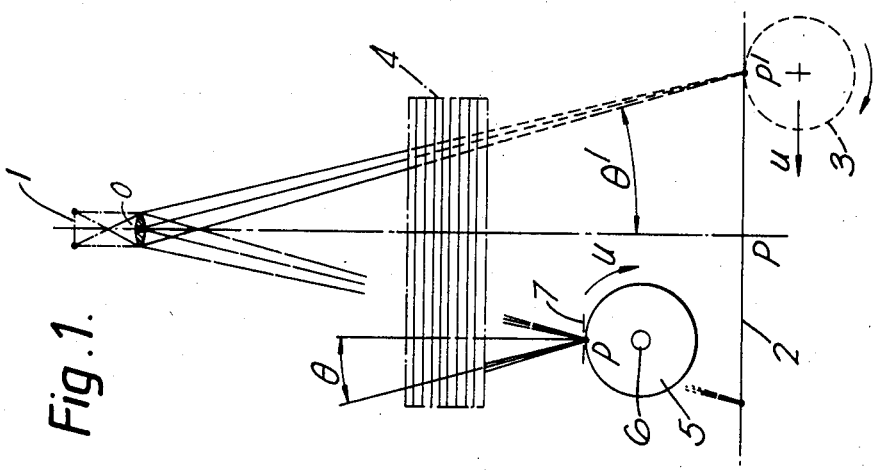

The invention will now be more fully described, by way of example, with reference to the accompanying drawings, in which:

FIG. 1 is a schematic plan of how the scanning system operates to scan an image onto a rotating drum, FIG. 2 shows in greater detail how the scanning unit of FIG. 1 works theoretically.

Figure 3:
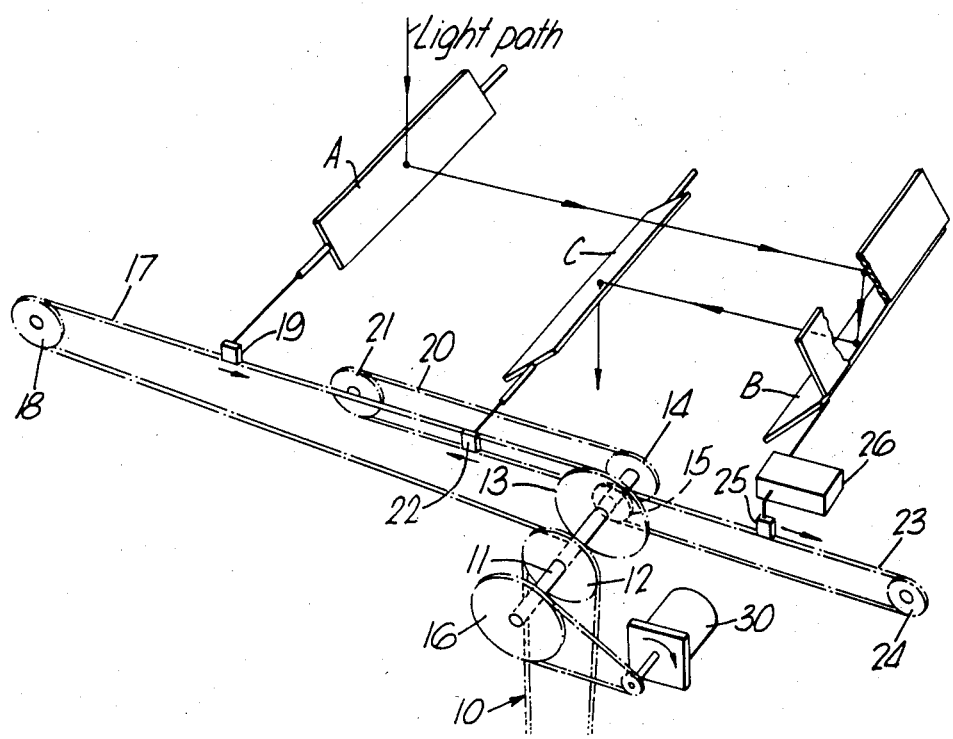
Figure 6:
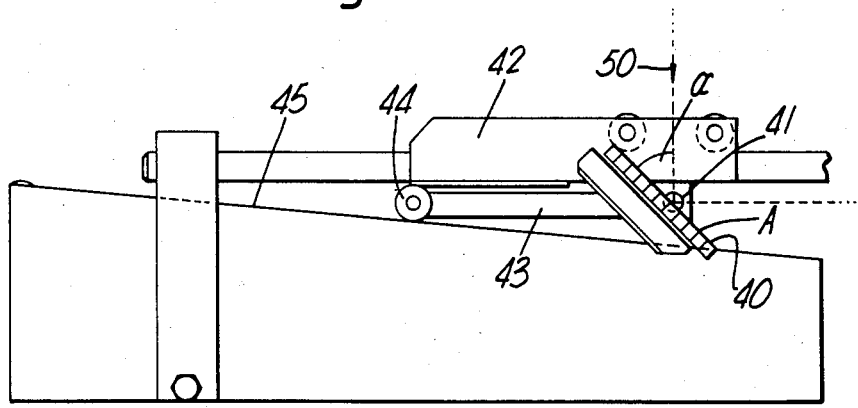
Figure 4:
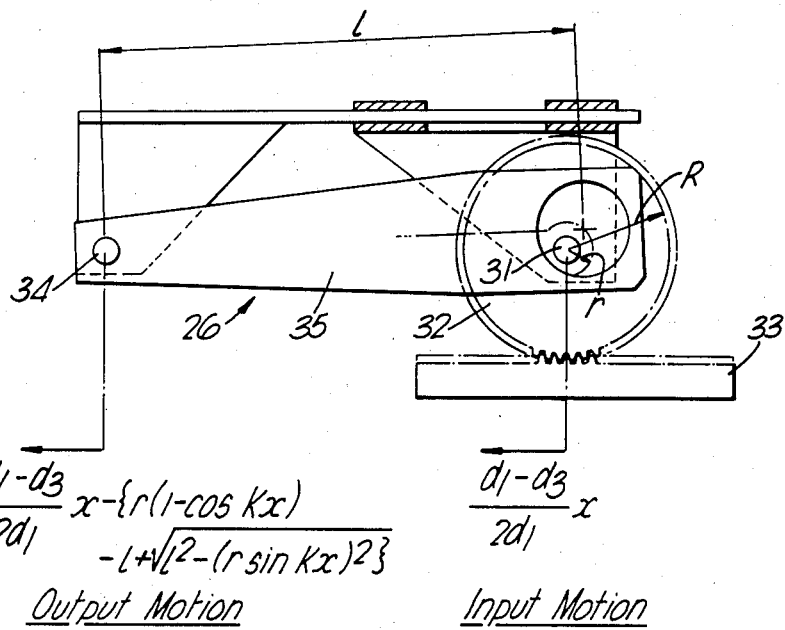
Figure 4:
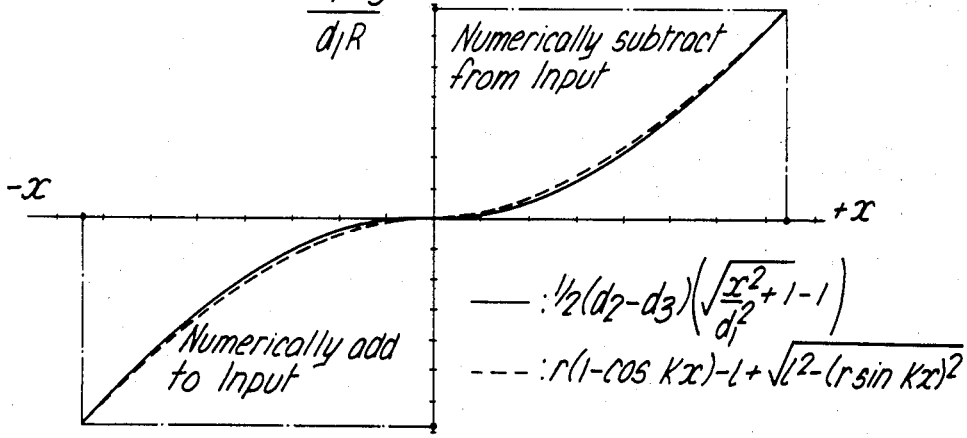
Figure 5:
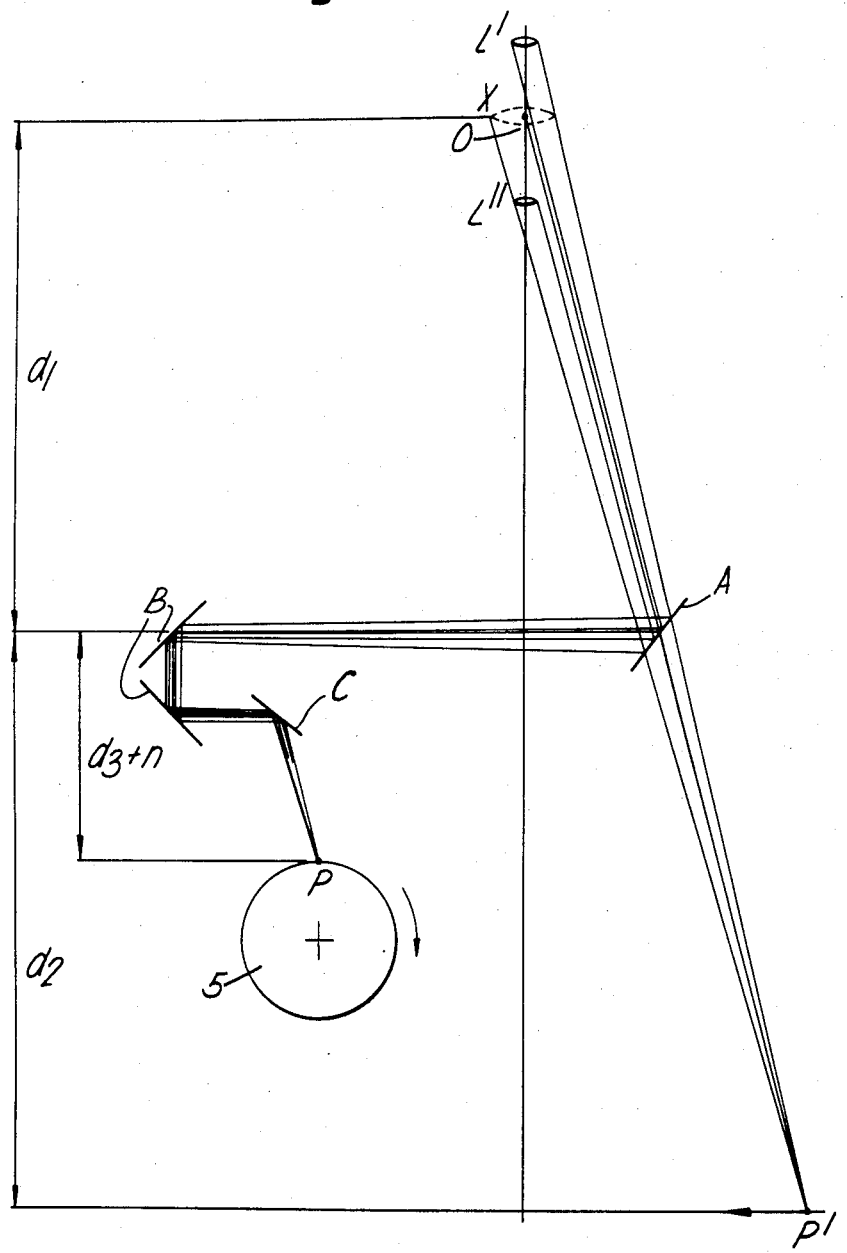

FIG. 3 shows a practical arrangement for translating the four reflecting surfaces, FIG. 4 shows how the motion of the ganged second and third reflecting surfaces can be perturbed in the required manner during their translation, FIG. 5 shows how a system according to this invention is insensitive to the distance of the image forming lens from the scanning device, and FIG. 6 shows in side elevation how the scan reflecting surface is tipped during its translation.

The principle of operation of a scanning system according to the invention will now be described.

PRINCIPLE OF OPERATION

If an object 1 is imaged by a lens having an optical centre 0 at the plane 2 as shown in FIG. 1, we may imagine a drum 3 rolling along the image plane 2 with constant speed u and the image may then be considered to be wrapped onto the periphery of the drum 3 starting from the point P'.

If, now, an optical mechanism 4 is interposed in the path of projection so that the light rays are deflected to image the point P on a real drum 5 of fixed centre 6 and rotating at a peripheral speed u, the image will be transferred, without distortion on to the surface of the drum 5 if the following conditions are satisfied:

(1) The optical path length O . . . P is always equal to the distance OP' for any corresponding point on the image plane 2, (2) The angles $\theta$ and $\theta'$ as shown in FIG. 1 are equal at any instant, and (3) The peripheral speed u is, as stated above, the same (i.e. between real and imaginary drums) at any instant, and preferentially is constant.

Note that a slit 7 is placed above the drum 5; this is only required to limit the curved surface of the drum 5 exposed to the image. The greater the drum diameter, the wider the slit 7 which may be used.

FIG. 2 shows the optical mechanism 4 as three movable mirror assemblies A, B and C, mirror assembly B being a double mirror. Solid lines have been used to show the ray paths at the start of the scan (OABCP) and dashed lines for the mid-point of the scan (OabcP).

The analysis of the required movements of the mirrors A, B, C to scan the image plane 2 onto the surface of the drum 5 is as follows:

In the central scan position (x=0), the distance Oa . . . b . . . cP must equal Op thus $$l+m+n=d_2-d_3 \qquad 1$$

If scan mirror A moves a distance x, then OA . . . CP must equal OP'. This requires that the movement y (of mirrors B) must compensate for the change between $(d_2-d_3)$ and AC.

Thus, we have $$x+l-y+n+m-(y+d_3 \tan \theta)=AC=(d_2-d_3) \sec \theta$$

but, from (1), $$l+m+n=d_2-d_3$$

thus, $$x-2y-d_3 \tan \theta = (d_2-d_3) \sec \theta - (d_2-d_3) \qquad 2$$

now, $\sec \theta = \sqrt{\tan^2 \theta + 1}$ where $\tan \theta = \frac{x}{d_1}$ $$\therefore \sec \theta = \sqrt{\frac{x^2}{d_1^2} + 1}$$

Substituting in (2)

$$x - 2y - \frac{d_3}{d_1}x = (d_2 - d_3)\sqrt{\frac{x^2}{d_1^2} + 1} - (d_2 - d_3)$$

-continued $$\text{Thus, } -2y + \left(-\frac{d_3}{d_1} + 1\right)x = (d_2 - d_3)\left(\sqrt{\frac{x^2}{d_1^2} + 1} - 1\right)$$

$$\therefore y = \frac{1}{2}\left\{\frac{d_1 - d_3}{d_1}x - (d_2 - d_3)\left(\sqrt{\frac{x^2}{d_1^2} + 1} - 1\right)\right\}.$$

Hence the total distance travelled by mirrors B will be $$y_{xmax} - y_{(-xmax)} = \frac{1}{2}\left\{\frac{d_1 - d_3}{d_1}x_{max} - (d_2 - d_3)\left(\sqrt{\frac{x_{max}^2}{d_1^2} + 1} - 1\right)\right\} - \frac{1}{2}\left\{\frac{d_1 - d_3}{d_1}(-x_{max}) - (d_2 - d_3)\left(\sqrt{\frac{(-x_{max})^2}{d_1^2} + 1} - 1\right)\right\} = \frac{d_1 - d_3}{d_1}x_{max}$$

The total distance travelled by mirror $A = 2x_{max}$
The total distance travelled by mirror C $$= 2\, d_3 \tan \theta_{max} = 2\frac{d_3}{d_1}x_{max}$$

(but this is in opposite direction to other movements)

Thus the mirrors A and C have a translation speed which is in direct proportion to the peripheral speed of the drum 5. The travel of mirrors B also bears a relationship to this speed but has also a superimposed motion imposed upon it.

In order to obtain these movements of the mirrors A, B and C, in the required theoretical ratios, the drive system shown in FIG. 3 has been used. A main drive belt 10 from the drum 5 is used to rotate a spindle 11 carrying five pinions 12-16. The belt 10 engages pinion 12. The pinion 13 supports an endless belt 17 which encompasses an idler wheel 18 and drives the mirror A via a belt-fixing member 19.

The pinion 14 supports an endless belt 20 which encompasses an idler wheel 21 and drives the mirror C via a belt-fixing member 22. Since the member 19 is on the upper flight of its belt and the member 22 is on the lower flight of its belt, the mirrors A and C move in opposite directions at fixed ratio speeds set by the sizes of the pinions 13 and 14.

The pinion 15 supports an endless belt 23 which encompasses an idler wheel 24 and drives a compensation drive mechanism 26 via a belt-fixing member 25. The member 25 is moved in the same direction as the member 19 and at a fixed ratio thereto, but the mirrors B have an additional motion superimposed on this which arises from the mechanism 26.

The mechanism 26 is an optimized 4-bar linkage (a gear driven crank) and is shown in FIG. 4.

FIG. 4 shows in the upper part the mechanism 26. The member 25 is connected via a bearing to a shaft 31 of a pinion 32 that runs on a fixed rack 33. Mirrors B are connected at 34 to a crank arm 35 which is eccentrically mounted relative to the pinion 32. Thus as mirrors B are moved backwards and forwards by the belt 23, the belt movement is perturbed by the eccentric mounting of the arm 35 to give the output motion shown in the upper part of FIG. 4.

From the lower part of FIG. 4 the match between the theoretical movement of mirrors B and the actual movement obtained with the gear driven crank is shown.

A cam arrangement could be used for the mechanism 26 that would give an exact match to the theoretical requirement but there is no need for such complication in practice.

As previously stated, the movements of scan mirror A and exit mirror C are uniform and in dirct ratio to the rotation of the drum 5.

Mirrors A and C must be tipped during the scan so that the rays are directed along the desired paths. If the mirror A is at 45° to the horizontal when x=0 (i.e. mirror A is an optical centre line) then the value for the tip angle is given by $$\text{tip angle} = 45° - \frac{1}{2}\arctan\frac{x}{d_1} \ldots (x \text{ is } + \text{ or } -).$$

Mirror C is positioned at 90° to mirror A as drawn in FIG. 2.

This tipping is accomplished by means of cams which should conform to the law stated above, although in practice the cam form can be approximated to a straight line law by suitable choice of parameters. A mechanism for providing the tip of mirror A is shown in FIG. 6.

The mirror A is mounted so that its front reflecting face 40 is precisely coplanar with the centre of a shaft 41 on which the mirror is mounted on a translatable carriage 42 which is moved by the belt-fixing member 19. The shaft 41 is fast to a lever arm 43 carrying a cam-follower wheel 44 at its distal end. The wheel 44 runs along an inclined cam surface 45. FIG. 6 shows mirror A in its mid-position when it is at an angle α to the vertical line 50 which is 45°. As the mirror A moves to the left the wheel 44 is raised to make the angle α smaller and as the mirror A moves to the right the angle α is made greater than 45°.

A similar arrangement is used for mirror C.

It is necessary to consider the peripheral movement of the drum and its relationship to the input drive to the scan mechanism, endeavouring to keep all drive ratios within the use of standard gears and pulleys. Unless cams or individual motor drives are used for the A, B and C movements, it is necessary to choose these movements so that they have simple integral ratios to each other, thereby making a drive, such as is shown in FIG. 3, possible.

A clue is offered here by the expression giving the movements in terms of the scan movement $x \ldots (-x_{max} \leq X > +x_{max})$ We have movement of $A = x$
movement of $B =$ -continued $$\frac{1}{2}\left\{\frac{d_1 - d_3}{d_1}x - (d_2 - d_3)\left(\sqrt{\frac{x^2}{d_1^2} + 1} - 1\right)\right\}$$

movement of $C = -\frac{d_3}{d_1}x$ where x may be positive or negative.

This leads to the ratios
A:B:C::$d_1$:½($d_1-d_3$):$d_3$ remembering that B must have a superimposed motion of $$\pm(d_2 - d_3)\left(\sqrt{\frac{x^2}{d_1^2} + 1} - 1\right)$$

Providing that $d_1$ (for A) and $d_3$ (for C) are multiples of even integers, a suitable integral value for B can be found. In a practical arrangement the relationship A:B:C::88:31:26 works well, as does the ratios A:B:C::54:19:16.

The small motor 30 shown in FIG. 3 (which drives pinion 16), is provided to accelerate the scan mechanism before engagement with the drive from the drum 5 and to provide a faster return drive.

Early consideration of the mathematics of such systems suggested that the quantity $d_1$—although important as a parameter in determining the proportions of the system—did not have a unique value for the position of any one projection lens.

This can be explained with reference to FIG. 5. Imagine a large-aperture lens X in the position of the nominal optical centre 0 (determined by $d_1$) focussed as if to image a point P', then the actual point image is produced at P. This will apply for all positions within the scan range.

It is readily seen that the wide cone of rays from X will include the smaller cones from real lenses L' and L" (still focussed on points P and P'). The only difference being that different portions of the mirrors are used during the scan.

Changes in a given lens distance from the scanning unit (whilst keeping $d_2$ constant) will only result in changing the image magnification but will not affect synchronisation of image and drum.

However, a change in $d_2$ will affect both image size and its synchronisation. This effect is eliminated when $d_1 + d_2 =$ constant i.e. when scanning mechanism is moved without changing the optical path length.

Thus it will be seen that the invention provides a distortion-free image on the surface of a drum 5. All moving parts are driven at speeds linearly proportional to the drum. Control cams for mirror tip can be straight-line ramps. The only non-linear motion is provided by a simple crank mechanism.

The slit width 7 is not important in relation to the imaging system and is only limited by second-order effects due to the curvature of the drum.

If, on the other hand, a similar system were to be used which had moving A and B mirrors but a fixed C mirror, the following disadvantages would arise.

(1) all drives would be non-linear with relation to one another, (2) an image distortion in the length of the image could be expected which is in excess of 1% for a comparable system, (3) the slit width would be more critical, and also could produce image distortion at right angles to the scan direction—i.e. in the width of the image.

The scanning system described is very useful for producing a latent charge image on a photoconductive drum as a stage in producing hard copy images of microfilms (i.e. scanning a projected image at magnification greater than six times).

The belts 10 and 20 can be toothed belts (or replaced by chain drives) to avoid slippage.

I claim:

1. An optical scanning system for projecting an image onto a moving surface, comprising a scan reflecting surface (A) to deflect an incident light ray into a first direction, second and third reflecting surfaces (B) mutually at right angles which together reflect the ray from the scan reflecting surface in a direction opposite to the first direction and displaced laterally therefrom and an exit reflecting surface (C) to receive the ray reflected from the third reflecting surface and to deflect it parallel to the incident ray onto the moving surface (5), means for translating said scan and exit reflecting surfaces (A, C) in opposite directions during a full scan of said image while maintaining said scan and exit reflecting surfaces at right angles to each other, means for rocking or tipping each of the scan and exit reflecting surfaces (A, C) during their respective translations while maintaining their right angle relationship throughout, means for translating the second and third reflecting surfaces (B) together in the same direction as the scan reflecting surface (A), and the translations of the scan and exit reflecting surfaces (A, C) being effected at respective uniform rates each of which has a fixed ratio to the rate of movement of the moving surface (5).

2. A system as claimed in claim 1, characterised in that the moving surface on which the scanned image is projected is the surface of a rotating drum (5), the translations of the scan and exit reflecting surfaces (A, C) being driven from a drive member (10) rotating the drum (5).

3. A system as claimed in claim 2, characterised in that the translation of the second and third reflecting surfaces (B) is also driven from the drive member (10) rotating the drum (5) via a motion rate perturbing means (26).

4. A system as claimed in claim 2, characterised in that the synchronisation of the image projected on the drum (5) is independent of the actual distance ($d_1$) of a projection lens (X) of the image to the scan reflecting surface (A).

5. A system as claimed in claim 1, characterised in that the rocking or tipping of the scan and exit reflecting surfaces (A, C) is effected automatically as a consequence of their translation via a respective cam/cam follower arrangement (44, 45) for each.

6. A system as claimed in claim 1, characterised in that the translations of the scan (A), linked second and third (B), and exit (C) reflecting surfaces are in the ratios $d_1$:½($d_1-d_3$):$d_3$ where $d_1$ and $d_3$ are multiples of even integers.

7. A system as claimed in claim 1, characterised in that the image is projected onto the moving surface with a magnification of 6 times or more.

8. A xerographic copying apparatus incorporating an optical scanning system as claimed in claim 1.

9. A copying apparatus as claimed in claim 8 which uses a microfilm as the source of the projected image.

* * * * *